No. 827,923. PATENTED AUG. 7, 1906.
D. LARSON.
ELECTRICAL CONTROLLER.
APPLICATION FILED JUNE 19, 1905.
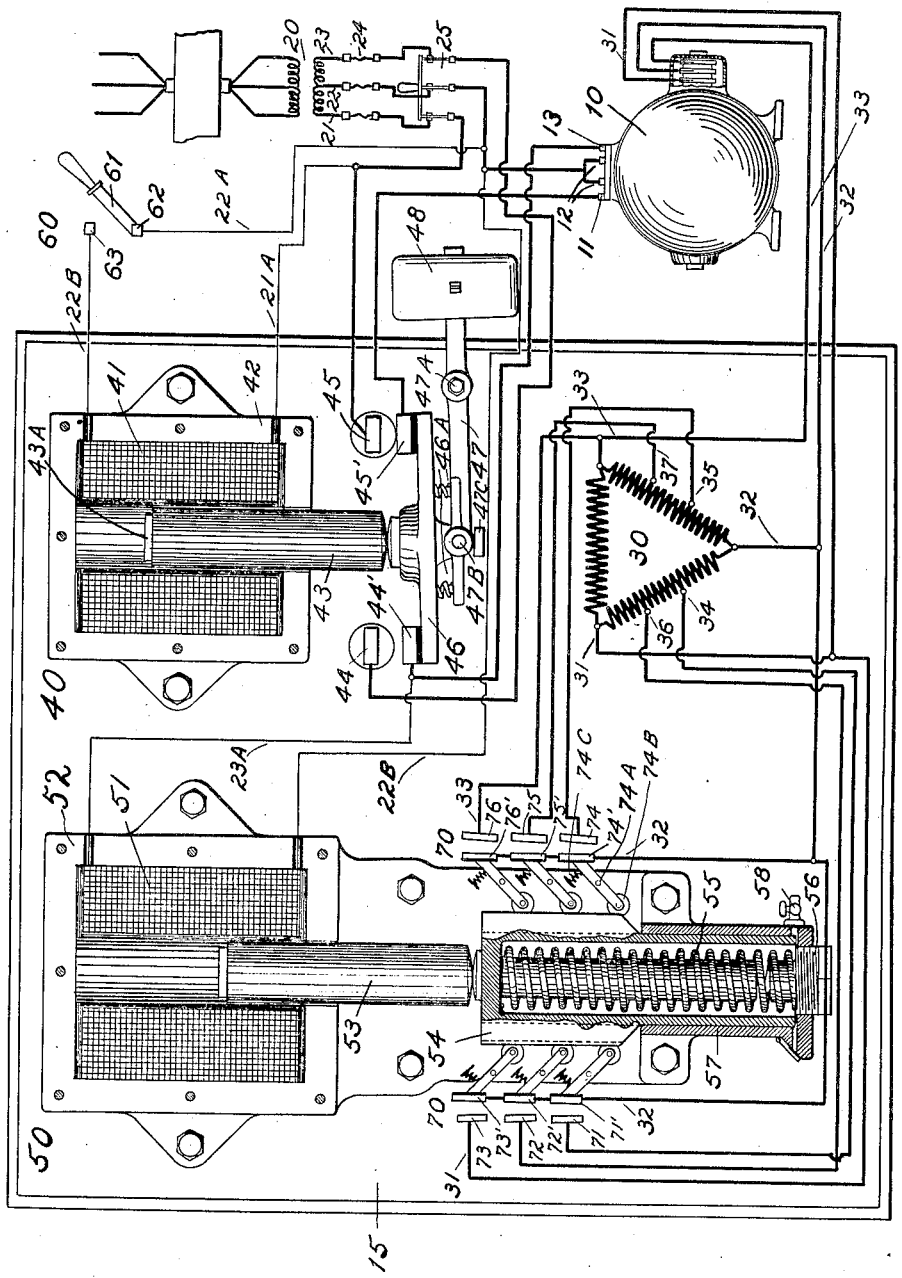
WITNESSES: Joseph E. Cavanaugh
Henry E. Kirby
INVENTOR
David Larson
BY
E. W. Marshall
ATTORNEY

UNITED STATES PATENT OFFICE.

DAVID LARSON, OF YONKERS, NEW YORK.

ELECTRICAL CONTROLLER.

No. 827,923.  Specification of Letters Patent.  Patented Aug. 7, 1906.

Application filed June 19, 1905. Serial No. 265,883.

*To all whom it may concern:*

Be it known that I, DAVID LARSON, a subject of the King of Sweden and Norway, and a resident of Yonkers, in the county of Westchester and State of New York, have invented certain new and useful Improvements in Electrical Controllers, of which the following is a specification.

My invention relates to that type of electrical switches or similar devices which are actuated by electromagnets, such as are energized by alternating currents.

I will describe my invention in the following specification and point out the novel features thereof in claims.

The drawing illustrates diagrammatically certain apparatus and circuits which may be used in carrying out my invention applied to an alternating-current motor-controlling system.

In the drawing, 10 designates a motor which is to be controlled.

20 is a transformer. Its primary may be connected to a suitable source of alternating-current electrical supply, and its secondary may be connected by the mains 21, 22, and 23 through fuses 24 and a main switch 25 to various parts of the apparatus.

30 designates an opposition element in the motor-circuit. It may be resistance or inductance or any other desired device or arrangement which will prevent too great a flow of current through the motor upon starting. In the drawing it is shown as a delta-connected resistance connected in circuit with the rotor of the motor by suitable conductors.

15 is a base of slate or other suitable material upon which certain parts of the apparatus used may be mounted. 40 designates a circuit-closer actuated by a magnet constructed for use with alternating currents. 50 is another electromagnetically-actuated circuit-closer designed to work on the same general principle. These circuit-closers are shown in vertical elevation partly in section, and their various parts will be pointed out later.

60 is a manually-operated switch or circuit-closer.

I will now point out the various parts more in detail and trace the electrical circuits and at the same time describe the operation of the apparatus.

The manually-operated switch 60 comprises a movable arm 61, which is pivoted at 62 and which may be moved against a stationary contact 63. When this is done, a circuit is established from the main 22 through conductor $22^A$, switch 60, conductor $22^B$, magnet-winding 41, and back to the main 21 through a conductor $21^A$. The magnet-winding 41 then will receive a single-phase current because connected across two of the mains. It will then energize the magnet-frame 42, which is constructed of laminated iron, and cause certain magnetic lines to be set up therein. This will attract the magnet armature or core 43, which is within the coil 41 and the frame 42, and cause it to be raised. The core 43 may be made of wire or laminated iron. As it rises it will close or include certain of the magnetic lines of force which are set up in the frame 42, and this will have the effect of reducing the flow of current through the winding of coil 41. Consequently this coil may be designed to have great economy of current consumption, for as the core 43 is not connected to anything only a small current in coil 41 will be needed to hold it in its raised position.

44 and 45 designate stationary contacts, and 44' 45' designate movable contacts adapted to coact with them. These movable contacts 44' 45' are mounted upon but insulated from a cross-piece 46. This cross-piece is flexibly attached at $47^B$ to one end of the pivoted lever 47, and springs $46^A$ may be interposed between the cross-piece 46 and the lever 47. The lever is pivoted at $47^A$ and carries a weight 48 at its other end.

The various parts just described are so proportioned and arranged that when the magnet is not energized it will rest upon the cross-piece 46 and hold the core or armature down against a stop $47^C$ in the position shown in the drawing, with its contacts 44' 45' removed from the stationary contacts 44 45; but when the magnet is energized and its core 43 lifted the weight 48 will raise the cross-piece until its contacts 44' 45' are closed against the stationary contacts 44 45. The springs $46^A$ tend to equalize the pressure between these contacts and so allow the weight to hold them firmly together as long as the core 43 remains in its raised position. The upper end of the core may be provided with a buffer $43^A$, of resilient material, if desired. This will serve the purpose of limiting the upward movement of the core 43 and of preventing the chattering noise which is so common in apparatus of this kind. The core 43 is arranged to be raised above the limit of the upward movement of the crosspiece 46, so that if there is any vibration of the core 43 it will not be transmitted to the contacts. Consequently the latter will be free from destructive sparking while a current is passing through them. The parts will remain in the positions described until the current is cut off from magnet-winding 41, as by opening switch 60, when the core will be released and will by its weight overcome the action of the weight 48 and will cause the parts to be returned to their first positions.

The main 21 may be connected to the contact 45, and the main 23 may be connected to the contact 44. Contacts 44' and 45' may be connected to the motor-terminals 13 and 11, respectively. The other main 22 is shown directly connected to the central motor-terminals 12. The contacts then, with their connected parts, form a circuit-closer for the motor. This circuit-closer is controlled by the core 43, although the latter is not connected to it. When the weight 48 closes the contacts, the motor 10 is connected to the mains and will begin to rotate. The motor will rotate slowly as long as the resistance 30 remains in its circuit. This resistance 30 is connected to the rotor of the motor through the usual slip-rings by conductors 31, 32, and 33.

I will now describe a device embodying the principle of this invention which may be used to cut the opposition element 30 gradually out of the motor-circuit.

50 designates an electromagnetically-controlled apparatus which comprises a magnet constructed for use with alternating currents with a winding 51, frame 52, and armature or core 53 similar to 41, 42, and 43. The coil or winding 51 may be connected by a conductor 22$^B$ to the main 22 and when contacts 44 and 44' are together by a conductor 23$^A$ to the main 23. The magnet will thus be energized and raise its core 53 in a manner similar to that already described. Below the core 53 is a series of circuit-closers 70 70, which comprise stationary contacts 71, 72, 73, 74, 75, and 76 and movable contacts 71', 72', 73', 74', 75', and 76'. The movable contacts are on arms which are pivoted, as at 74$^A$, which carry on their other ends antifriction-rollers, as at 74$^B$, and may be pressed toward the stationary contacts by springs, as at 74$^C$. When the controlling-magnet is not energized, the movable contacts are held back out of engagement with the stationary contacts by a cam member 54, which engages with the antifriction-rollers, such as 74$^B$. This cam member may be raised out of engagement with these antifriction-rollers and allow the movable contacts to be pushed against their corresponding stationary contacts by means of a spring 55, the tension of which may be regulated by a threaded piece 56. The spring 55 is preferably of insufficient strength to accomplish this result as long as the core 53 is resting upon the cam member 54, but will push the cam member 54 up when the core is lifted from it. As it is usually desirable to have the operation a gradual one, a dash-pot 57 may be provided to retard the upward movement of the cam member, and this dash-pot may be regulated by means of a stop-cock 58. All the movable contacts 71' 72' 73', 74', 75', and 76' are connected by a conductor 32 to the resistance 30 and to the rotor of the motor. The stationary contacts 71 and 74 are connected to this resistance at 34 and 35, respectively, the stationary contacts 72 and 75 are connected to the resistance at 36 and 37, respectively, and the stationary contacts 73 and 76 are connected to the upper corners of the resistance and to the rotor of the motor by conductors 31 and 33, respectively.

When the magnet-core 53 is raised and the cam member allowed to move upward, the movable contacts 71' and 74' will first be closed against the stationary contacts 71 and 74. This will short-circuit a part of the resistance 30. Then the movable contacts 72' and 75' will be closed against the stationary contacts 72 and 75 and will short-circuit another portion of resistance 30, and finally movable contacts 73' and 76' will be closed against stationary contacts 73 and 76 and short-circuit the remainedr of the resistance 30. This operation may be made as gradually as desired and in any desired number of steps. The resistance will remain short-circuited until the magnet is deënergized and the core 53 is allowed to again rest upon the cam member 54, when it will compress the spring 55, push the cam member down, and cause the contacts which it controls to be opened.

The magnet armatures or cores 43 and 53 are free from the other parts of the apparatus. Consequently they may be moved quickly. This is a great advantage, especially when used in connection with slow-moving parts, such as those retarded by a dash-pot. As the cores may be thus raised quickly and as the current consumption is cut down as soon as the cores are raised, they may be made quite heavy and be raised by a quick impulse-current and yet with small power consumption. This arrangement obviates many of the defects in similar apparatus and is applicable to many devices in which it is desired to control a moving part by an alternating-current electromagnet. I do not wish to limit myself to single-phase alternating-current apparatus, as my invention is clearly applicable to use with other alternating, intermittent, or pulsating currents and to a great variety of apparatus.

Devices actuated by alternating currents are subject to vibrations due to the current alternations and such vibrations harmfully affect circuit-closers and similar devices. Such devices are noisy, and the vibration not only causes sparking on contacts, but is liable to cause the apparatus to be shaken apart.

The efficiency of an alternating-current magnet is low unless it is arranged so that its magnetic lines are closed together to reduce the current flowing through its coil after it has actuated the parts which it controls. It is important to construct the magnetic frame and armature or core of such a magnet of laminated magnetic material.

In the device herein shown and described the peculiar combination of parts has overcome many troublesome defects hitherto found in apparatus of this kind. When the coil or winding energizes the field and the armature or core, the latter is moved out of its contact with the circuit-closer, so that when the circuit-closer is moved to close the contact the armature has been raised to such a level that it is free and clear from the various parts of the circuit-closer. When the circuit for the coil is broken, the armature drops against the circuit-closer and forces it open, and by this simple device all vibration, sparking, and noise in the circuit-closers is avoided.

When I use the term "core or armature," I mean such part as is arranged to be moved by the magnet when the magnet is energized and which may be brought into such relation with the frame of the magnet as to close and partially short-circuit the magnetic lines in the magnet-frame.

I do not mean to limit myself to controlling a circuit-closer, as this invention is applicable as well to any device which is actuated by an alternating-current magnet.

What I claim is—

1. A source of alternating-current supply, a movable device, a magnet comprising a field and armature of laminated magnetic material and a winding, said armature being disconnected from the movable device but resting upon it and preventing movement of said movable device when the winding of the magnet is not energized.

2. A source of alternating-current supply, a circuit-closer, a magnet comprising a field and armature of laminated magnetic material and a winding, said armature being disconnected from the circuit-closer but resting upon it and arranged to prevent the movement of the circuit-closer when the winding of the magnet is not energized but to be lifted off from the circuit-closer when the winding is energized.

3. A source of alternating-current supply, a circuit-closer, a magnet comprising a field and armature of laminated magnetic material and a winding, said armature being disconnected from the circuit-closer but resting upon it and arranged to prevent the movement of the circuit-closer when the winding is not energized, but to be lifted off from the circuit-closer when the winding is energized, and independent means for actuating the circuit-closer when the winding is energized.

4. A source of alternating-current supply, a circuit-closer, contacts therefor, a magnet comprising a field and armature of laminated magnetic material and a winding, said armature being disconnected from the circuit-closer but resting upon it and arranged to prevent the movement of the circuit-closer when the winding of the magnet is not energized, but to be lifted off from the circuit-closer when the winding is energized, and independent means for actuating the circuit-closer and firmly holding the contacts together when the winding is energized.

5. A source of alternating-current supply, a circuit-closer, contacts therefor, a magnet comprising a field and armature of laminated magnetic material and a winding, said armature being disconnected from the circuit-closer but resting upon it and arranged to prevent the movement of the circuit-closer when the winding of the magnet is not energized, but to be lifted off from the circuit-closer when the winding is energized, independent means for actuating the circuit-closer and firmly holding the contacts together when the winding is energized, and means for connecting or disconnecting the alternating-current supply to or from said winding.

6. A plurality of circuit-closers, a cam member arranged to actuate said circuit-closers, a solenoid, a core therefor disconnected from said cam member but arranged to directly hold the circuit-closers open by its weight upon said cam member when the solenoid is not energized, and independent means for moving the cam member and actuating the circuit-closers step by step when the solenoid is energized.

7. A plurality of circuit-closers, a cam member arranged to actuate said circuit-closers, a solenoid, a core therefor disconnected from said cam member but arranged to directly hold the circuit-closers open by its weight upon the cam member when the solenoid is not energized, and independent adjustable means for moving the cam member and actuating the circuit-closers step by step when the solenoid is energized.

8. A plurality of circuit-closers, a cam member arranged to actuate said circuit-closers, a solenoid, a core therefor disconnected from the cam member but arranged to directly hold the circuit-closers open by its weight upon the cam member when the solenoid is not energized, independent means for moving the cam member and actuating the circuit-closers step by step when the solenoid is energized, and a retarding device for the actuating means.

9. A plurality of circuit-closers, a cam member arranged to actuate said circuit-closers, a solenoid, a core therefor disconnected from the cam member but arranged to directly hold the circuit-closers open by its weight upon the cam member when the solenoid is not energized, independent means for moving the cam member and actuating the circuit-closers step by step when the solenoid is energized, and an adjustable retarding device for the actuating means.

10. A plurality of circuit-closers, a cam member arranged to actuate said circuit-closers, a solenoid, a core therefor disconnected from the cam member but arranged to directly hold the circuit-closers open by its weight upon the cam member when the solenoid is not energized, adjustable means for moving the cam member and actuating the circuit-closers step by step when the solenoid is energized, and an adjustable retarding device for the actuating means.

11. A plurality of circuit-closers, a cam member arranged to actuate said circuit-closers, a single-phase current, a solenoid arranged to be energized thereby, said solenoid comprising a frame of laminated magnetic material, and a core of laminated magnetic material, said core being disconnected from the cam member but arranged to directly hold the circuit-closers open by its weight upon the cam member when the solenoid is not energized, and independent means for moving the cam member and actuating the circuit-closers step by step when the solenoid is energized.

12. A movable body, an alternating-current magnet, an armature, a winding therefor, said armature arranged to control the movable body and being disconnected from said body and arranged to be raised by the winding and to close the magnetic lines of the magnet.

13. A movable body, an alternating-current magnet, a winding and an armature therefor, a resilient stop for the armature, said armature being disconnected from the movable body but arranged to control the same and arranged to be raised by the winding against the resilient stop and to close the magnetic lines of the magnet.

14. A plurality of circuit-closers, an alternating-current magnet, a winding and an armature therefor, said armature being disconnected from said circuit-closers but arranged to hold the circuit-closers open when the winding is not energized and independent means for actuating the circuit-closers step by step when the winding is energized, said armature being arranged to be raised by the winding and to close the magnetic lines of the magnet.

15. A plurality of circuit-closers, a cam member arranged to actuate said circuit-closers, a magnet, a winding and a quick-acting armature therefor, said armature being disconnected from the cam member but arranged to directly hold the circuit-closers open by its weight upon the cam member when the winding is not energized, independent means for moving the cam member and actuating the circuit-closers, and a retarding device for raid actuating means.

16. One or more circuit-closers, a cam member arranged to actuate said circuit-closers, an alternating-current magnet, a winding and a quick-acting armature therefor, said armature being disconnected from the cam member but arranged to directly hold the circuit-closers open by its weight upon the cam member when the winding is not energized, independent means for moving the cam member and actuating the circuit-closers when the armature is raised, and a retarding device for said actuating means.

17. A circuit-closer, an alternating-current magnet comprising a frame and an armature of laminated magnetic material and a winding, said armature being entirely disconnected from the circuit-closer but arranged to control the same, and independent means for actuating the circuit-closer when the magnet is energized, said magnet being arranged to raise the armature above the limit of travel of the circuit-closer.

18. A motor, a circuit-closer therefor, a magnet, a winding and an armature therefor being disconnected from said circuit-closer, but arranged to directly hold the latter open by its weight when the winding is not energized and independent means for actuating the circuit-closer when the winding is energized.

19. A motor, a circuit-closer, a solenoid and a core therefor disconnected from said circuit-closer but arranged to control the same, independent means for actuating the circuit-closer when the solenoid is energized, said solenoid being arranged to raise the core above the limit of travel of the circuit-closer, an opposition element in the motor-circuit, a plurality of circuit-closers arranged to cut the opposition element out of the motor-circuit, a second solenoid and core arranged to control said plurality of circuit-closers and independent means for actuating said plurality of circuit-closers when said second solenoid is energized.

20. A motor, a circuit-closer therefor, a solenoid, a core disconnected from said circuit-closer but arranged to control the same, independent means for actuating the circuit-closer when the magnet is energized, means for controlling the acceleration of the motor, a second solenoid having a core disconnected from the motor-accelerating means but arranged to control the same, a manually-operated switch in circuit with said first solenoid and means actuated by the first solenoid for closing the circuit in the second solenoid.

21. A source of alternating-current supply, a circuit-closer, a solenoid-magnet comprising a frame and a solenoid-core of laminated magnetic material and a solenoid-winding, said core being arranged to have considerable movement and being disconnected from the circuit-closer but resting upon it, and arranged to prevent movement of the circuit-closer when the winding of the solenoid is not energized, but to be lifted off from the circuit-closer and above the movement of the circuit-closer when the solenoid is energized.

In testimony whereof I have signed my name to this specification in the presence of two subscribing witnesses.

DAVID LARSON.

Witnesses:
JOSEPH E. CAVANAUGH,
ERNEST W. MARSHALL.